US010527351B2

(12) United States Patent
Fausto

(10) Patent No.: US 10,527,351 B2
(45) Date of Patent: Jan. 7, 2020

(54) DRYER WITH THERMAL RECOVERY FOR COMBINE HARVESTER

(71) Applicant: UNICABLE S.R.L., Siena (IT)

(72) Inventor: Fernando Fausto, Castiglion del Lago (IT)

(73) Assignee: UNICABLE S.R.L., Siena (SI) (IT)

( * ) Notice: Subject to any disclaimer, the term of this patent is extended or adjusted under 35 U.S.C. 154(b) by 36 days.

(21) Appl. No.: 15/776,466

(22) PCT Filed: Oct. 16, 2017

(86) PCT No.: PCT/IB2017/056406
§ 371 (c)(1),
(2) Date: May 16, 2018

(87) PCT Pub. No.: WO2019/021046
PCT Pub. Date: Jan. 31, 2019

(65) Prior Publication Data
US 2019/0170438 A1 Jun. 6, 2019

(30) Foreign Application Priority Data
Jul. 25, 2017 (IT) ........................ 102017000084696

(51) Int. Cl.
*F26B 19/00* (2006.01)
*A01D 41/133* (2006.01)
(Continued)

(52) U.S. Cl.
CPC .......... *F26B 19/005* (2013.01); *A01D 41/127* (2013.01); *A01D 41/133* (2013.01);
(Continued)

(58) Field of Classification Search
CPC .......... F26B 19/005; F26B 3/04; F26B 17/20; F26B 23/001; F26B 2200/06; A01D 41/127; A01D 41/133; A01F 12/46
See application file for complete search history.

(56) References Cited

U.S. PATENT DOCUMENTS 2,537,186 A   1/1951   Everett
3,581,407 A   6/1971   Ward et al.
(Continued)

FOREIGN PATENT DOCUMENTS

CN   103875355 B   10/2015
CN   105009787 B   3/2017
(Continued)

OTHER PUBLICATIONS

International Search Report, PCT Patent Appln. No. PCT/IB2017/056406, dated Jan. 30, 2018.
(Continued)

*Primary Examiner* — Jessica Yuen
(74) *Attorney, Agent, or Firm* — Nancy J. Flint, Attorney at Law, P.A.; Nancy J. Flint, Esq.

(57) ABSTRACT

A dryer for installation on a self-propelled machine, such as a combine harvester, with recovery of the exhausted thermal energy coming from the endothermic engine of the latter. The dryer is of the on-line type and comprises at least two feed screws, internally to which grain is moved towards a tank and dried by the hot air coming from a first and second heat exchangers respectively, the first heat exchanger being crossed by the high temperature exhaust fumes of said endothermic engine and the second heat exchanger by the cooling liquid.

20 Claims, 7 Drawing Sheets

(51) Int. Cl.
*F26B 3/04* (2006.01)
*F26B 17/20* (2006.01)
*F26B 23/00* (2006.01)
*A01D 41/127* (2006.01)
*A01F 12/46* (2006.01)

(52) U.S. Cl.
CPC ............. *A01F 12/46* (2013.01); *F26B 3/04* (2013.01); *F26B 17/20* (2013.01); *F26B 23/001* (2013.01); *F26B 2200/06* (2013.01)

(56) References Cited

U.S. PATENT DOCUMENTS

| | | |
|---|---|---|
| 4,021,929 A | 5/1977 | Black |
| 4,209,918 A | 7/1980 | Klein |
| 5,156,570 A | 10/1992 | Justice, III |
| 5,682,683 A | 11/1997 | Halmer |
| 6,536,133 B1 * | 3/2003 | Snaper ................. A23B 9/04 219/698 |

FOREIGN PATENT DOCUMENTS

| | | |
|---|---|---|
| DE | 1134546 B | 8/1962 |
| DE | 202010004817 U1 | 5/1977 |
| FR | 1283297 A | 2/1962 |
| GB | 784861 A | 10/1957 |
| JP | S5594735 U | 7/1980 |

OTHER PUBLICATIONS

Written Opinion, PCT Patent Appln. No. PCT/IB2018/056406, dated Jan. 30, 2018.

* cited by examiner

DRYER WITH THERMAL RECOVERY FOR COMBINE HARVESTER

TECHNICAL FIELD

The present invention belongs to the sector of the machines used to dry grain, for instance corn, wheat, barley, rye, maize, millet, or the like, while it is harvested.

More specifically, the scope of the present invention is a device to be installed aboard the agricultural machines that operate in the field, such as self-propelled combine harvesters and the like.

In particular, the present invention makes it possible to dry grain by taking advantage of the waste thermal energy coming from the internal combustion engine of the agricultural machine, thus presetting it to storage and simultaneously preserving quality of harvest.

PRESENT STATUS OF THE ART

After being harvested in the field, grain shall be stored and, to prevent it from degrading, it is necessary to remove part of the humidity contained in the seeds, so as to provide optimum storage conditions.

Some cautions shall be taken in this treatment, by reconciling the need for performing the drying operation in a short time with the need for not increasing the temperature of grain too much, in order not to jeopardize a number of important characteristics such as, for instance, its future germinability.

Fixed dryers are known, placed in proximity to the storage locations, which are used to reduce humidity of cereals in general, or of other seeds. Movable dryers are also known, which can be transported on roads up to in proximity to the harvesting area. Both these types of machines are generally equipped with a heat generator which burns a fuel, usually oil or gas, to generate a stream of hot air which is directed to lick grains, so as to decrease its humidity. Should the seeds be intended for human or animal feeding, the dryers are of the indirect fire type, i.e. they are equipped with a heat exchanger which heats atmospheric air thanks to the thermal energy contained in the burnt gases, thus preventing the seeds from being contaminated by a direct contact with the products of combustion.

Dryers, even though high-performing, versatile, and adaptable, are such that drying represents an intermediate processing between harvesting and storage, which entails increased times and costs indeed. This is the reason why dryers have been developed which can be installed aboard combine harvesters, and make it possible to process grain before the latter is output from the agricultural machine. U.S. Pat. No. 2,537,186 (A) discloses a dryer for installation on a combine harvester; the operation of this device specifies that, according to a special embodiment, the exhaust gases of the engine of the machine flow internally to a first drying stage, which is followed by a second stage where grain is processed with external air, so as to further cool down and dehumidify the seeds before their transfer into a tank. The adjustment of the operating parameters of the drying treatment takes place, in a way that entails major operating limitations, by separately controlling both the flow rate of the hot air and gas stream from the engine and the flow rate of the external air input to the second stage.

The solution proposed by U.S. Pat. No. 2,537,186 (A) features a number of drawbacks. First of all, the direct use of the exhaust gases coming from the engine, without any heat exchanger and any system to regulate their flow rate, makes grain unusable for human feeding and irreversibly damages its germinability and quality because of the high temperatures that are reached in some sections. Furthermore, the direct use of the exhaust gases of the engine entails a strong risk of fire, even because of the dust particles always present in big quantities. Secondly, the stirrers used to keep grain suspended in the hot air stream as necessary for its conveyance tend to mechanically damage it.

Similar drawbacks also affect the dryer disclosed in U.S. Pat. No. 3,581,407 (A), even though, in this case, grain is conveyed internally to a vertical feed screw along a path co-currently with the exhaust gases of the engine of the combine harvester. The exhaust gases directly lick grain and tend to increase the temperature of part of the seeds, and specifically those which are located in proximity to the central axle of the feed screw and to the gas inlet area, up to a temperature very close to the temperature of the gases output from the engine, thus damaging the harvest and substantially increasing the risk of fire, especially when the flow rate of grain decreases. On the other hand, if the flow rate of grain is not constant and the input port of the feed screw became even partially empty, this might make it possible a back flow of the hot gases, which consequently would tend to flow along this alternative path.

In U.S. Pat. No. 5,682,683 (A) a heat exchanger is used to recover the thermal energy contained in the exhaust gases of the engine of a harvester of light vegetable parts, such as herbs and straws, to dry them after shredding. Such patent proposes a material handling mode during drying that is not applicable to grain. As a matter of fact, in this case the stems of the vegetables are transferred along a plurality of horizontal paths, which develop on superimposed planes, thanks to the combined action of air, heated internally to the heat exchanger and blown from the bottom, and a plurality of feed screws. More in details, the air heated by the heat exchanger is input to chambers located below the feed screws and communicating with the latter by way of perforated walls through which air flows and makes the vegetal layer moved by the feed screws float. The solutions described above exclusively take advantage of the thermal energy coming from the exhaust gases of the engine, whereas they do not take advantage of the energy in excess made available by the liquid of the cooling liquid of the engine, whose temperature is lower than that of the exhaust combustion gases.

U.S. Pat. No. 4,209,918 (A) discloses an indirect fire dryer wherein the external air, before getting hot in a heat exchanger fed with the burnt gases, is pre-heated by way of the radiator of the engine of the agricultural machine. The hot air thus generated is then channeled towards a tank which comprises grain handling means, a drying column, and means for feeding this column with hot air. The grain in proximity to the bottom of the tank is first collected in a container and subsequently picked up by a vertical feed screw which transfers it to the opposed end of a perforated column externally licked by hot air.

In another patent, U.S. Pat. No. 5,156,570 (A), the grain tank is directly hit by a stream of air heated in a heat exchanger in which the cooling liquid of the engine flows.

In the devices described in U.S. Pat. Nos. 4,209,918 (A) and 5,156,570 (A) it is unlikely for the processed product to be treated homogeneously, in that treatment too much depends on the position where grain is located internally to the tank, so much so that in the former of the two devices there is an actual possibility that, internally to the vertical column, one and the same seed is treated several times as compared to the remaining seeds.

Although numerous variants of dryers for agricultural machines have been proposed, a need is still felt for a device that allows to maximize energy recovery, while providing a high quality of dried grain and the possibility of controlling the process in all of its peculiar steps. Insofar as is known, there is no dryer directly installable on agricultural machines equipped with means for separating grain from straw and from chaff, which is capable of treating the material according to such temperature versus humidity content curve as to preserve quality of seeds and, simultaneously, is capable of exploiting both the thermal energy of the combustion fumes and that released by the cooling liquid.

Even though this theme cannot be approached in one way, it is deemed that the maximum temperature allowed for drying is inversely proportional to humidity content, as indicatively shown in the diagram in FIG. 1. This theme is, for instance, dealt with in the article "problemi di essiccazione del mais e suoi prodotti" (drying problem for maize and its products) published in the magazine "Tecnica Molitoria" in March 2001.

OBJECTS AND SUMMARY OF THE INVENTION

A first object of the present invention is thus to provide a dryer that can be installed on existing combine harvesters without major modifications and that uses the thermal energy dissipated by the endothermic engine of the agricultural machine, by taking advantage of its own characteristics of the thermal streams which could otherwise be scattered in the environment.

A second object of the invention is to provide for an on-line treatment, i.e. a treatment that takes place while grain is transferred to the tank, in order not to negatively interfere with the operativeness of the combine harvester.

Advantageously this configuration also facilitates the achievement of a good homogeneity of the treated grain, in that it prevents the uncertainties related to extracting grain from the tank in which the grain itself is subsequently re-injected: in traditional devices, it frequently occurs that the grain that occupies those zones of the tank which are subject to a lower reshuffle is less dried.

In order to have a homogeneous product to store in the tank, it is also necessary to provide for a possibility of continuously and rapidly regulating the drying treatment upon change of the operating conditions, so as to make the operating temperatures and flows adapt to the mass flow rate of grain, which varies suddenly in the course of harvest.

A further object of the present invention is to limit damages to grain. Other objects and advantages of the invention will be apparent to those skilled in this art upon reading the following text.

The above-mentioned objects are achieved by using a dryer wherein the operating parameters in the course of the drying operation follow a given temperature vs grain humidity content curve and wherein grain handling prevents mechanical damages, such as, for instance, those due to impacts or crushings.

The dryer according to the present patent application comprises at least a first feed screw and a second feed screw whose helicoids get in extreme proximity to the inner surface of the pipe thus pushing the just harvested grain towards a collection tank at such a speed that grain does not obstruct the longitudinal stream of the heated air that is drying it. In the first feed screw, the air inlet port is located in the start section and the outlet port is located in the end section, whereas in the second feed screw, according to a preferred embodiment, air enters transversally through a plurality of inlet points and then flows longitudinally.

Advantageously is the air blown by the fan means which at least partially pick it up from the external world heated by two different streams of thermal energy provided by the endothermic engine of the combine harvester.

At the beginning of the drying process, grain is particularly moist and requires much energy for water evaporation, but its temperature shall be kept low in order not to degrade the quality of the dried product. Conversely, when grain has already been processed, especially before enters the tank, it is essential to prevent local temperature peaks, in order not to damage those grains which contain a reduced quantity of evaporable water and whose temperature rapidly increases.

Advantageously the dryer according to the present patent application exploits the exhaust fumes of the engine to heat the air that flows through the first feed screw, which makes it possible for it to operate at a high air flow rate which facilitates the drying of the just harvested grain, and uses the heat released by the cooling liquid of the endothermic engine internally to the second feed screw.

The exploitation of the burnt gases and of the cooling liquid according to the teachings of the patent application, besides improving the yield of the drying process, preserves the quality and the characteristics of grain. The temperature of the cooling liquid, which generally does not exceed 100° C., is lower than that of the exhaust fumes and is generally closer to the temperature envisaged for drying. Furthermore, the heat released internally to the second heat exchanger is easily adjustable by acting on the flow rate of the cooling liquid: as a matter of fact, the heat in excess can be disposed of by the radiator of the engine without causing negative effects onto the final part of the treatment.

Further advantages come from a number of preferred configurations of the heat exchanger associated with the second feed screw, as described below, in which hot air flows internally to the feed screw after passing through a set of holes which develop longitudinally on a portion of the pipe. According to a version of the dryer which reduces even more the risk of an overtemperature for grain, the cooling liquid that heats air flows longitudinally internally to the heat exchanger placed adjacent to the second feed screw, in the same sense as grain, i.e. co-currently.

The dryer according to the present patent application makes it easier to control the process, by operating on the basis of the grain humidity and/or temperature values sensed in one or several points; if one sensor only is installed, dryer adjustment takes place according to a feedback approach as a function of the humidity value of the grain input to the tank. A preferred embodiment of the invention comprises a programmable logic controller which allows for an automatic variation of the operating parameters without requesting for a combine harvester operator to intervene. In accordance with a much-appreciated mode of use, it is possible to adjust the temperature of the air output from the heat exchanger on the basis of grain humidity and to check that the humidity at the output from the feed screw is that envisaged. If the latter condition is not met, the speed of rotation of the feed screw is decreased until reaching a condition whereby the air flow is reduced because of the increased level of grain internally to the feed screw, or the further actions mentioned in the detailed description are carried into effect.

According to an embodiment which is especially suitable for processing light grain and makes a process control easier, the dryer comprises a number of branches which deliver air in successive longitudinal sections of the first feed screw.

According to a particularly complete embodiment of the invention, part of the air that flows through the first feed screw is recirculated by the fan means after being mixed with the external air, if its relative humidity makes it possible to still extract vapor from grain.

BRIEF DESCRIPTION OF THE DRAWINGS

FIG. 4 shows the pipe (11) of the first feed screw (1) in an open position to make it possible to replace the helicoid (15), if any, the grain discharge opening (12), and the external air stream inlet port (13) and outlet port (14) after the external air stream passes through the first heat exchanger (3). In the embodiment here shown, heat exchange takes place in countercurrent, the exhaust fumes of the engine (31) entering from the side opposed to the external air inlet (33), as with the exhaust fumes leaving the engine (32) and with the external air outlet (34). The external air stream, after longitudinally licking the first feed screw, is ejected through an outlet port (14), which is provided with a seed retention grid, then it is disposed of into the environment through an output duct (81) or is recirculated through a recirculating duct (82) in the direction towards the fan means (6).

FIG. 5 shows the transversal transfer feed screw which receives grain from the first feed screw (1) via a load opening (51) and delivers it to the second feed screw via an unload opening (52). The transversal transfer feed screw is located on a plane lower than the first feed screw (1), so that grain enters it by gravity and falls down in the load opening (51).

FIG. 6 shows an exploded view of a second heat exchanger (4) which, in the embodiment here shown, develops longitudinally adjacent to and below the second feed screw (2). After entering an input port (43) of the second heat exchanger, external air goes through a radiator (46) located internally to a manifold (45) to reach the second feed screw (2) after passing beyond a perforated portion (23) of the pipe. The entry of the cooling liquid from an engine (41) into the heat exchanger takes place from the same end as the external air stream input port (43), which is the closest to a grain load opening (21). Grain enters the second feed screw (2) by gravity because the grain load opening (21) is on a plane lower than the unload opening (52) of the transfer feed screw. The external air stream output port (24) is in proximity to a grain unload opening (22) and these are close to an engine cooling liquid output (42).

FIG. 7 shows a bottom view of the elements mentioned in the previous figure.

In a particularly versatile embodiment, the second feed screw (2) can be used both in a configuration wherein the manifold is located above and in a configuration wherein the manifold is located below.

Figure 9:
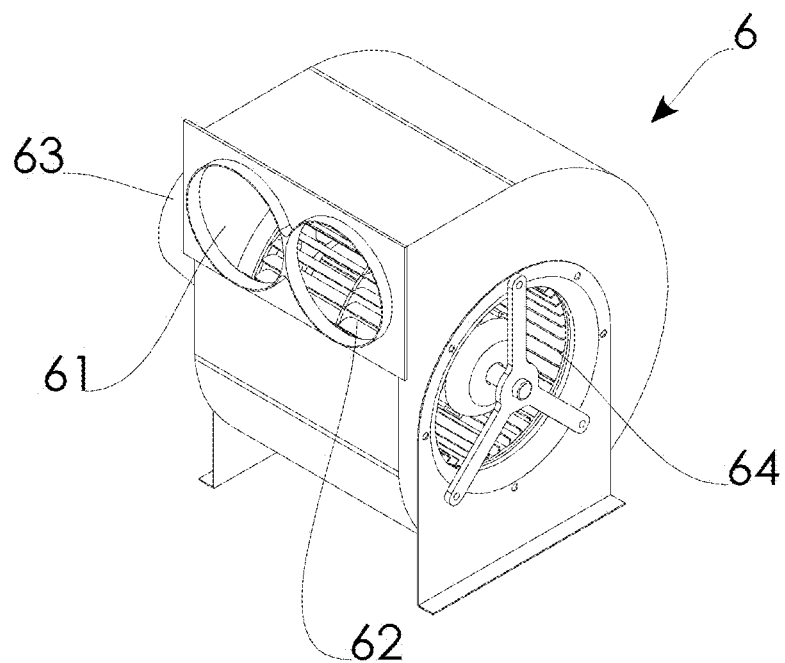

FIG. 9 shows the fan means (6) which comprise a centrifugal fan (64) which takes air from the external world, or from the recirculating duct (82), via an input opening (63) and delivers it to the first heat exchanger or to the second heat exchanger via a respective first output (61) and second output (62).

Figure 10:
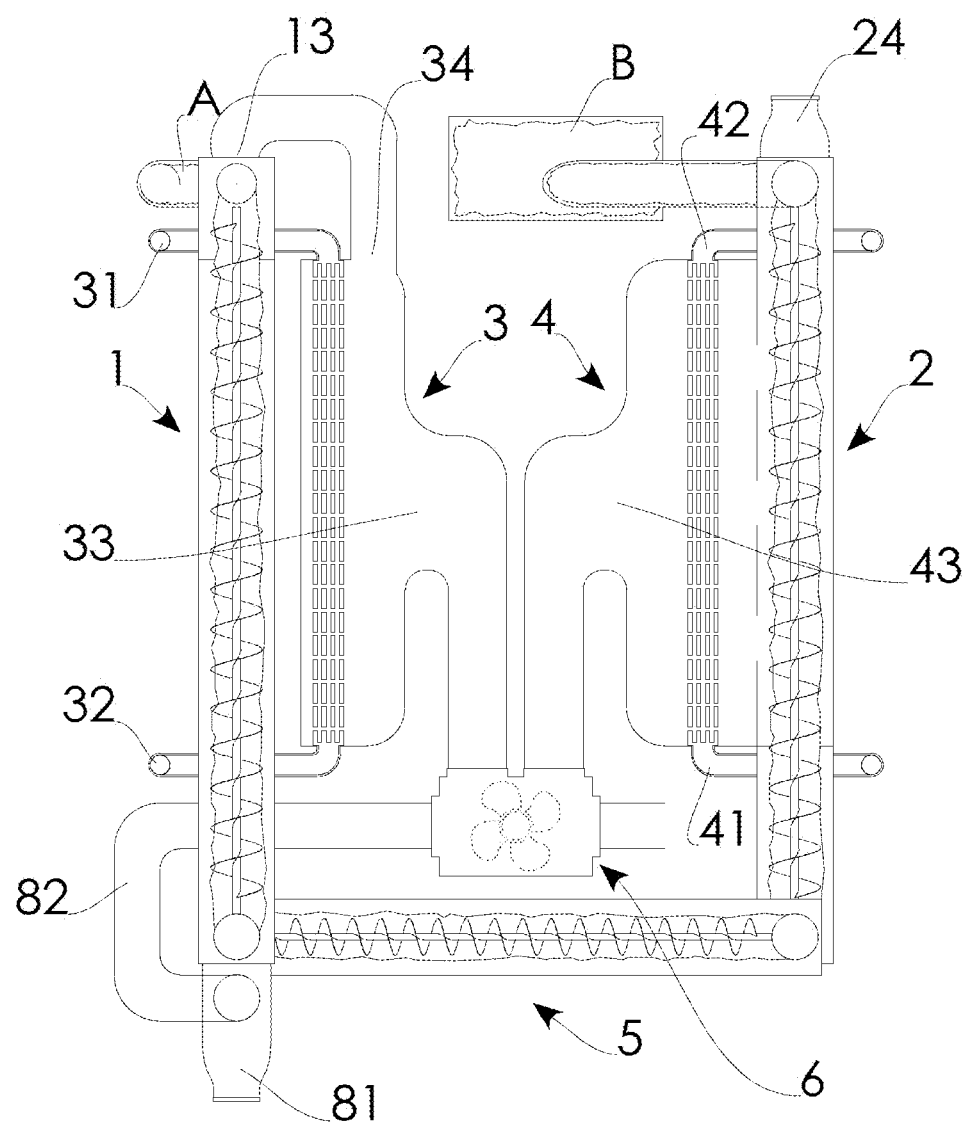

FIG. 10 shows a diagram of an embodiment of the invention.

Figure 11:
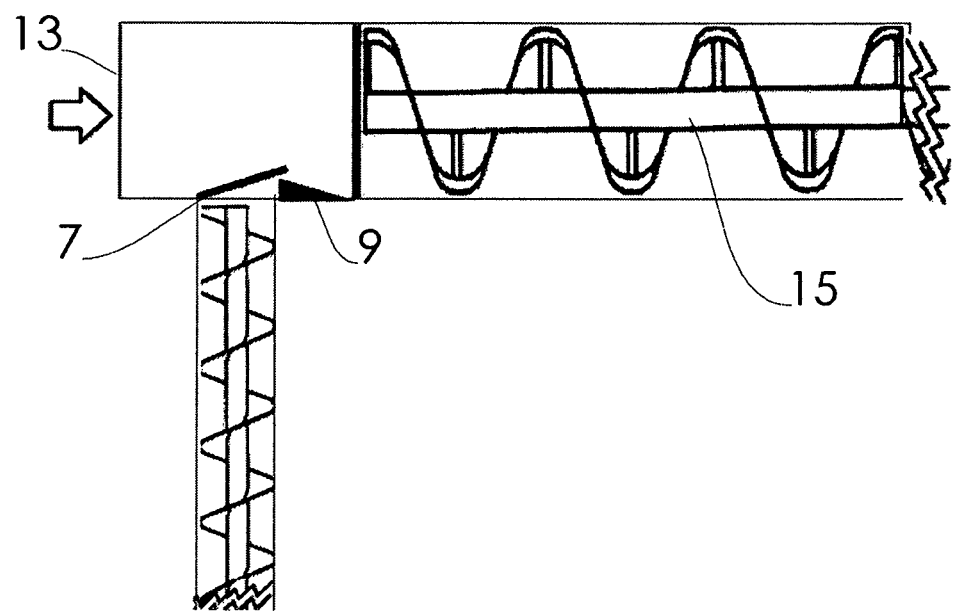

FIG. 11 shows a particularly simple and effective embodiment of retention means which prevent hot air from entering the grain supply ducts. The figure shows a check valve of the swing check or clapet type, which closes the output port of the feed screw of the combine harvester thanks to the action exerted by the hot air itself at the input to the first feed screw. Whenever the combine harvester is in operation, the input grain lifts the clapet valve and enters the first feed screw. Advantageously the embodiment here shown includes a ramp (9) which aids grain in falling down towards the helicoid of the first feed screw. According to more complete embodiments, the valve can be provided with weights or elastic means which aid its closure; these solutions are specially used in the case of small seeds and/or light seeds for which air stream is more limited, in order to prevent them from being conveyed.

Figure 12:
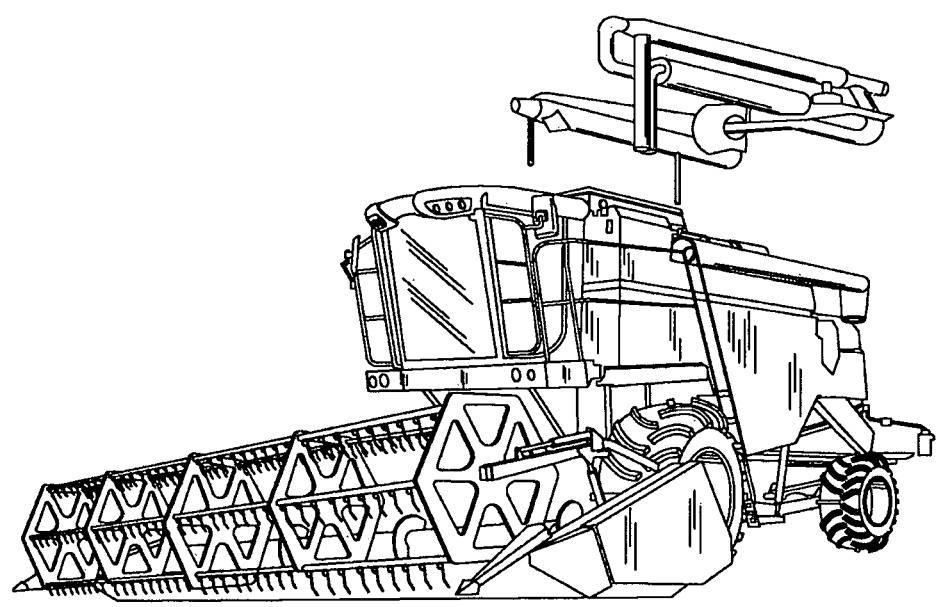

FIG. 12 shows an arrangement of the dryer on a combine harvester according to a preferred approach which allows to maximize the length of the feed screws, thus increasing treatment time, the remaining design parameters being equal.

DETAILED DESCRIPTION OF AN EMBODIMENT OF THE INVENTION

According to a preferred embodiment, the grain dryer in accordance with the present patent application comprises a horizontal transfer feed screw (5) between a first feed screw (1) and a second feed screw (2), also horizontal, whose helicoids (15, 25) move the grain (A) harvested by the combine harvester towards a collection tank (B) and sweep the inner surface of the pipe that accommodates them. The dryer is secured to the combine harvester by way of connection means of a known type, such as threaded connections or welds. The dryer might even be anchored to the combine harvester in a reversible manner. The dryer can be supported by a removable frame, so as to render its installation on the combine harvester simpler.

Internally to the feed screws, grain lays on the lower half-surface of the pipes, is longitudinally pushed by the helicoid, and is further moved by the bulges that rise up from the helicoid (15) of the first feed screw; in a more complete embodiment, a plurality of bulges also rise up from the helicoid of the second feed screw. The dimensions of the bulges used to stir grain is usually greater for greater grains, and is lower for small-size and light grains. According to a particularly versatile solution, bulges are interchangeable and helicoids are accessible through the pipe of the feed screw, which possibly includes hinged openable parts or can be formed of several parts reversibly connected to each other so as to make it easier to disassemble them, possibly to allow to perform maintenance on the helicoid or internal cleaning.

The feed screws laying horizontally greatly reduce the possibility that grain crowds together in its start section, thus preventing air from longitudinally flowing. All the same, the present invention can also be implemented by using oblique feed screws and, in any case, the dryer according to the present patent application still operates even when the combine harvester operates on sloping grounds, thanks to the innovative adjustments described below; in particular, should the air stream tend to be shut off, provisions are made to increase, possibly for few seconds only, the speed of rotation of the helicoid of the feed screw, so as to rapidly remove the obstruction and restore the longitudinal stream.

In the embodiment here described, the grain that goes through said first and second feed screws is licked by the air coming from the external world and is blown by fan means (6); grain is not treated when passing along the transfer feed screw (5).

The fan means start up as soon as presence of grain is sensed at the input of the first feed screw, preferably via a contact, ultrasound, pressure, or similar sensors, or upon receipt of an information from the control system of the combine harvester. In the embodiment here described, the fan is a variable speed, hydraulic, centrifugal fan. In addition, separate regulation valves are located on each of the two outputs, so as to render the air flow rates towards the two heat exchangers independent. At the input, external air is advantageously filtered by using self-cleaning devices.

The transfer feed screw, besides improving grain homogenization before the second drying step, if any, makes it possible to exploit the space on the combine harvester at best, by transversally connecting the first and second feed screws, which are parallel to each other.

According to a particularly complete solution, the transfer feed screw (5) is also crossed by hot air, so as to allow for harvesting particularly humid grain or in the case wherein the extension of the first feed screw has been limited upon designing it and is found not to be sufficient to provide for optimum conditions for grain at the input to the second feed screw or even if one wishes to further exploit the air output from the first feed screw. Preferably is the air output from the first feed screw injected into the transfer feed screw, provided it is not saturated with humidity yet.

Air longitudinally crosses the first feed screw by entering it in proximity to the grain inlet and leaving it from the opposed end, close to the grain unload opening (12).

Upstream of the first feed screw (1), there is usually provided a lifting feed screw or another handling system, independent of the dryer and controlled by the combine harvester. The air used for drying grain shall not run back the grain supply ducts and for this reason air containment means are provided. Even when there is no grain incoming, an air backflow might cause malfunctions in the combine harvester, whose regulations generally depend on the air flow rate values measured.

According to a first solution, grain is unloaded internally to a collection bowl from which grain enters the first feed screw by overflowing. Another particularly simple solution is illustrated in FIG. 11, to the description of which reference is made. Although affected by some drawbacks, the same handling means used for the combine harvester could operate as retention means, for instance by making the above-mentioned lifting feed screw have at least one section obstructed by grain.

According to a particularly complete embodiment, the overflow bowl, besides obstructing the passage of air, also allows to divert grain directly into the tank (B), if no drying is planned.

Before entering the first feed screw (1), air flows through a first heat exchanger (3) wherein it is heated by the exhaust fumes of the endothermic engine of the combine harvester. Because of reasons of space and occupation, this heat exchanger can be placed below the first feed screw (1), in a position close to the exhaust gas outlet, after installing the dryer on the combine harvester.

According to an approach that safeguards the quality of the processed grain, the flow rate of the air inlet to the first heat exchanger (3) is adjusted on the basis of its temperature at the output from its exchanger itself, whose maximum value depends on the type of grain processed and on the quality level to be achieved. Since the temperature admitted for drying also depends on the humidity content of grain, a grain humidity sensor is usually installed at the input to the first feed screw (1), which can also be taken advantage of to set the desired change of humidity content of grain in the course of the drying treatment. On the exhaust fumes side, there is provided a three-way valve which is used to choke the released heat or to bypass the heat exchanger, should the latter not be in operation. Such valve also provides for maintaining an appropriate temperature of the fumes that are discharged into the atmosphere. The adjustment of the air temperature at the output from the first heat exchanger preferably takes place with minor oscillations, in the order of 5%.

The main limit to the flow rate of the air input to the first feed screw is related to the transportability of the lightest grain internally to the stream. Especially for those grains which feature a greater density, there is a trend towards maximizing thermal recovery internally to the first heat exchanger (3) by using countercurrent streams in order to increase the drying capability of the first feed screw (1).

In order to reduce the risk of having the lightest grains dispersed, in a particularly complete embodiment the air circuit from the first heat exchanger (3) comprises a number of branches which deliver air in corresponding sections of the first feed screw, so as to limit the air flow rate in the start section of the feed screw. Advantageously can these branches be provided with appropriate choking or intercepting means, not only to operate with grains of different densities, but also to allow a regulation of the drying process, as illustrated below.

The air that crosses the second feed screw is heated by cooling liquid used for said endothermic engine internally to a heat exchanger (4). In the embodiment here described, a three-way valve in the circuit that supplies the cooling liquid to the second heat exchanger (4) makes it possible to choke, or to shut off, the flow rate towards the heat exchanger, thus reducing the thermal input and conveying part of the liquid towards the radiator of the engine cooling circuit.

According to a preferred embodiment, the second heat exchanger (4) comprises a manifold (45) featuring a longitudinal development, with a radiator (46) located inside and crossed by the cooling liquid, adjacent to and below the second feed screw (2). The air heated by the manifold (45) enters the second feed screw via a perforated portion (23) of the surface of the pipe which overlooks the inside of the manifold (45). Conveniently is this perforated portion an interchangeable grid to adapt the diameters of the holes to the dimensions of the treated grain; the diameters of the holes might even be smaller than one millimeter.

According to an embodiment that preserves quality of grain, which is obtained by preventing temperature peaks in the terminal sections, the endothermic engine cooling liquid flows through the manifold (45) longitudinally in the same sense according to which grain flows internally to the second feed screw (2).

Process control plays a particularly important role in adapting the operation of the dryer to operating conditions different from the design ones and in tracking the continual changes of grain flow rate in the course of harvesting. Since the control used is a feedback control, the dryer in accordance with the present patent application makes it possible to implement numerous variants of the operating logic. These variants might differ not only in their rules, but also in the set of detections taken by the sensors that account is taken of and in the parameters of grain that are controlled. In addition, the different versions also differ from each other in the greater or lower level of integration with the control system of the combine harvester. For instance, the dryer is usually equipped with an input grain mass flow rate sensor to make it possible to preliminarily set the operating parameters; advantageously can the same information be provided by the control system of the combine harvester.

The feed screws, and particularly the diameters and pitches of their helicoids, are engineered, account being taken of the mass flow rate processed by the combine harvester, so as not to obstruct the passage of the external air streams in a neighborhood of the speed of rotation of the design feed screw. As a matter of fact, it is preferred to prevent the installation of a further tank at the input by having the dryer directly in line between the grain supply duct and the collection tank. The design speed is determined account being taken of the length of the feed screws so as to provide for grain permanence times proportionate to the heated air temperatures, which are relatively low. In order to increase the length of the feed screws, the latter develop preferably perpendicularly to the axles of the combine harvester.

In a particularly complete embodiment, the control system does not only regulate the temperatures of the streams as described above, but it also follows the optimum drying curve of the grain being processed, by varying the air flow rates, the recovery flow rates of the endothermic engine, and the speeds of rotation of the feed screws, thus providing for a homogeneous treating of the complete input grain as well as a homogeneous air flow internally to the feed screws.

Figure 1:
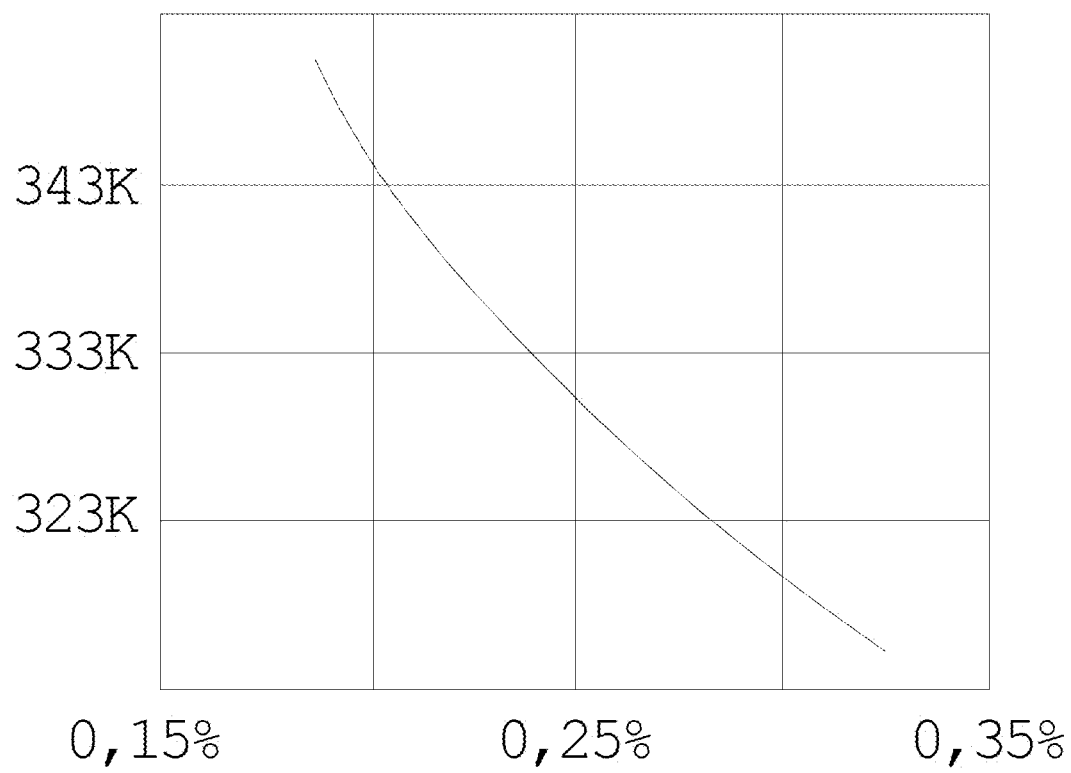
FIG. 1 shows a diagram which indicatively illustrates the optimum curve of grain being dried, i.e. it shows how the admitted temperature of grain varies as a function of its humidity.
Figure 2:
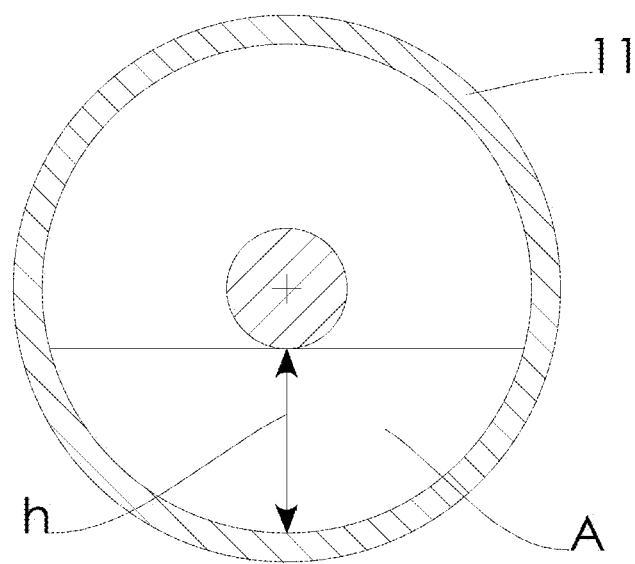
FIG. 2 shows a transversal cross-sectional view of the first feed screw, the core of the helicoid only being shown; the figure indicates a condition wherein air flow is obstructed because of grain (A) being accumulated up to a height (h) equal to the difference between the inner radius of the pipe and the outer radius of the core of the helicoid. According to a preferred operating mode, which is applicable to normal dimensions of the cores being marketed, the speed of transfer of grain (A) makes it possible for the latter to occupy approximately one third of the inner diameter of the pipe (11).
Figure 3:
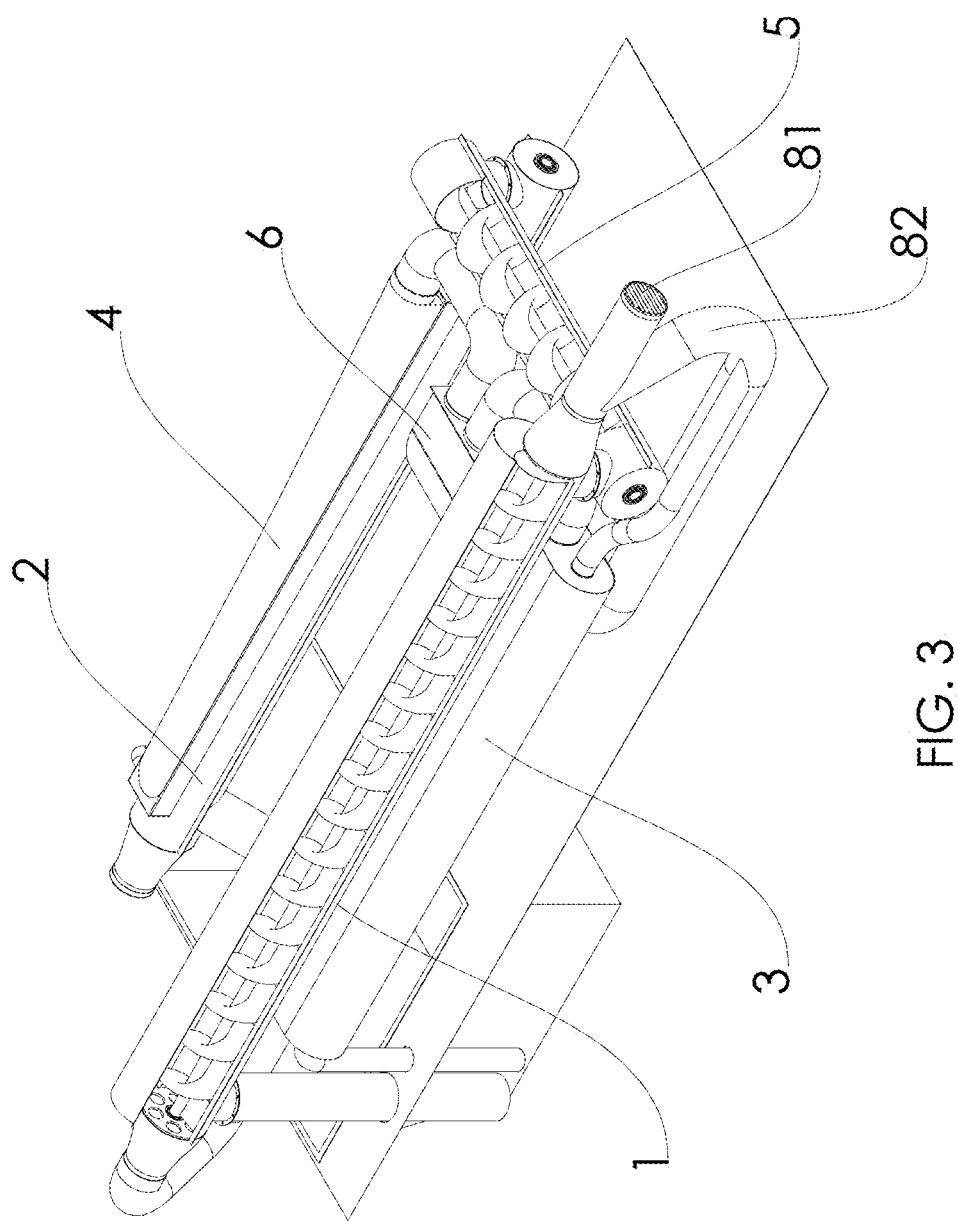
FIG. 3 shows an axonometric view of an embodiment of the dryer according to the present patent application. In particular, the figure shows a first feed screw (1) and a second feed screw (2) which are horizontal and parallel to each other, a first heat exchanger (3) and a second heat exchanger (4), a transfer feed screw (5), and fan means (6).
Figure 4:
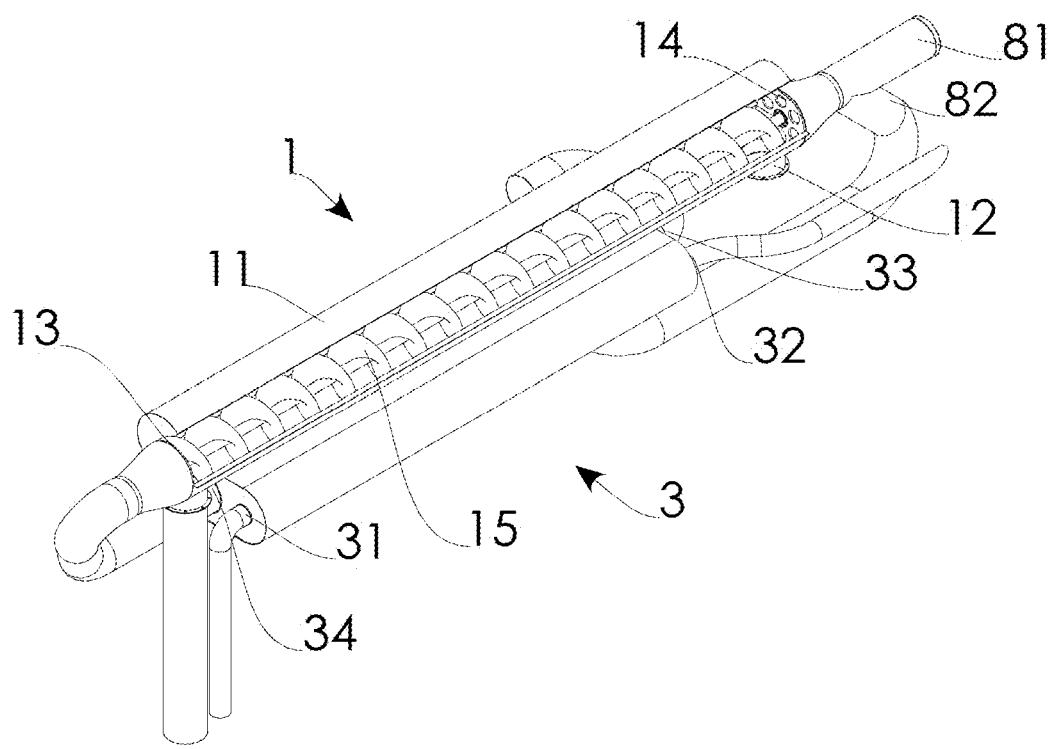
FIG. 4 thru 7 show detailed axonometric views of different component parts of the dryer of FIG. 3.
Figure 5:
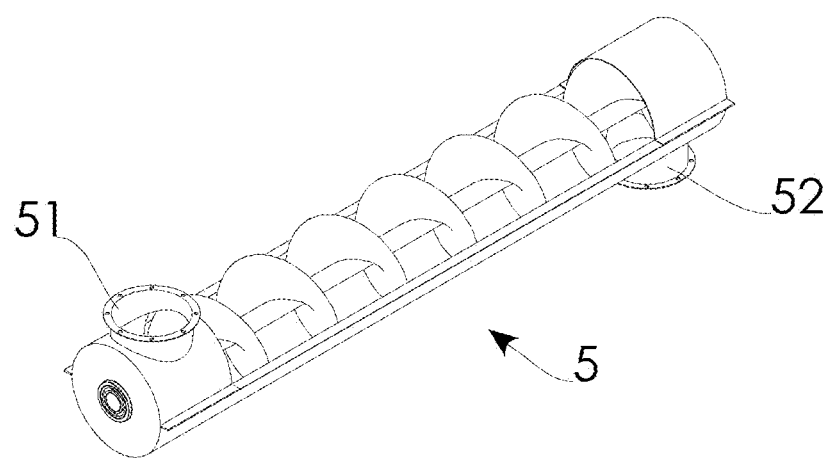
Figure 6:
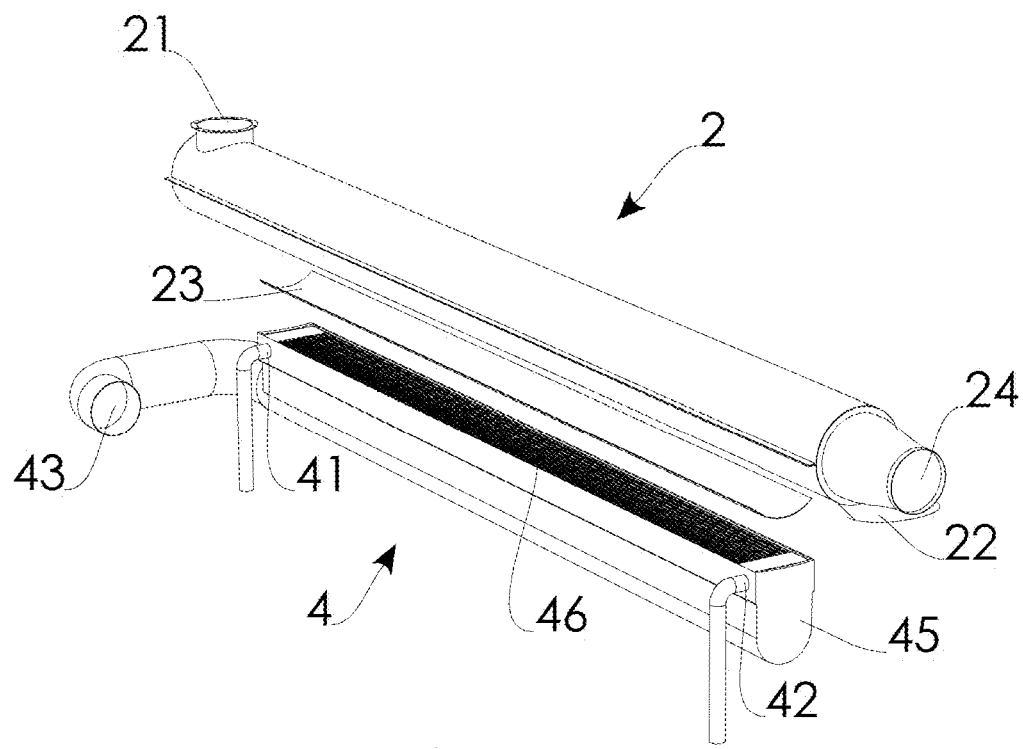
Figure 7:
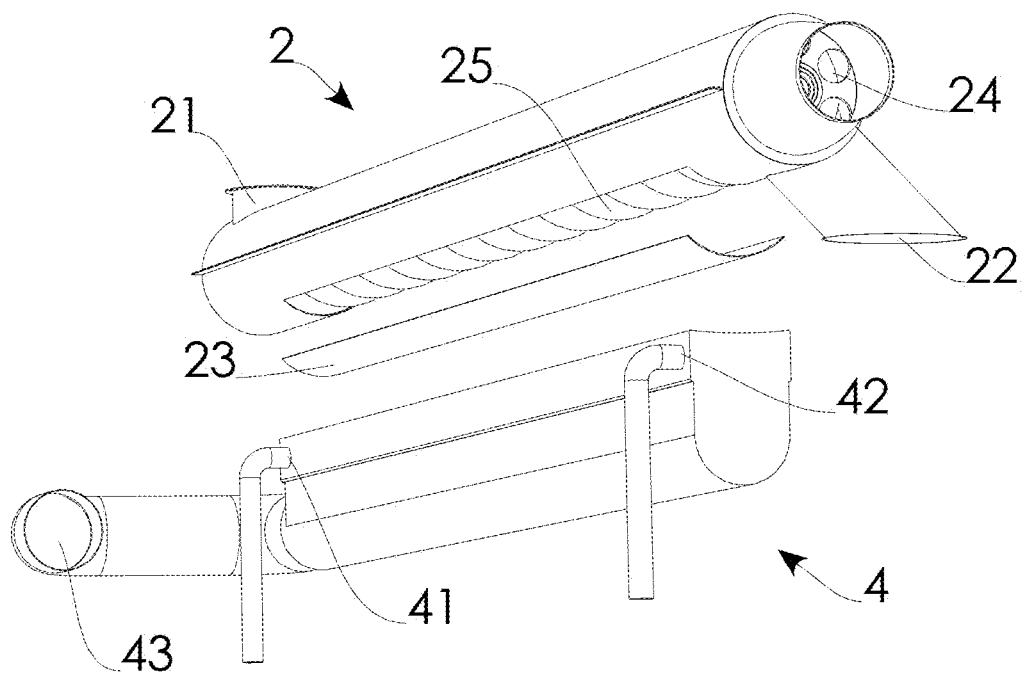
Figure 8:
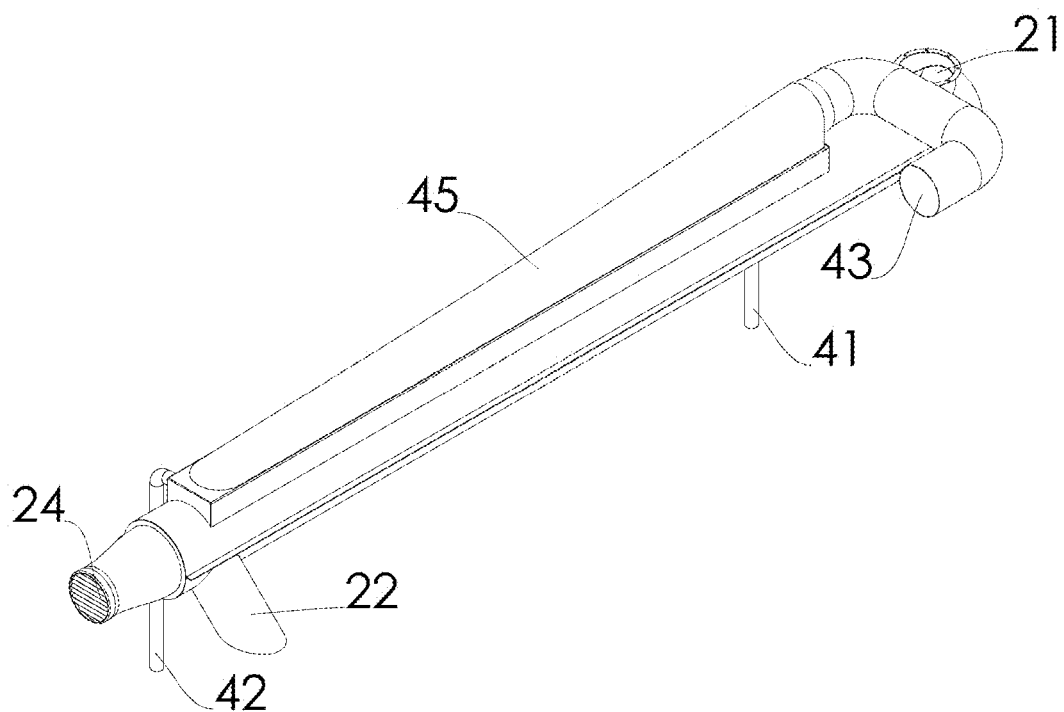
FIG. 8 shows a different coupling between the second feed screw (2) and the second heat exchanger (4) as compared to that shown in FIGS. 6 and 7. According to this arrangement, hot air is blown in the upper part of the second feed screw, so as to reduce turbulence internally to the latter and limit dragging of the lightest and smallest seeds by the air flow.

According to a particularly complete embodiment, the operation can be controlled by a programmable logic controller, in order not to request a combine harvester operator to intervene while harvesting is in progress to make regulations or adjustments as necessary to take account of any changes in grain flow rates and/or humidity. If might occur that, when the operating conditions vary, grain accumulates in one or several sections of the first feed screw, thus preventing a normal longitudinal air stream from flowing; such condition is shown in FIG. 2. Advantageously a preferred embodiment comprises means used to measure the flow, or possibly the flow rate, of air internally to the first feed screw. In accordance with a particularly practical and simple solution, the air flow rate is measured from the outlet port (14) of the first feed screw (1) and the speed of rotation of the feed screw is adjusted accordingly. In the embodiment here described, the programmable logic controller makes the speed of rotation of the helicoid of said first feed screw progressively increase whenever said air sensing means detect an obstruction in the air stream. Initially, or in combination with an increase of speed, the control system might control the opening of the choking and intercepting means of said branches of the air circuit.

The same principle of operation can be applied to the second feed screw (2), even though, in this case, no air circuit branches are present.

According to a preferred embodiment there are present grain temperature and humidity sensors at the output from the first feed screw and from the second feed screw. One skilled in the art will realize that it is possible to use alternative and substantially equivalent test methods and instruments.

According to a particularly effective control sequence, if the humidity of the grain output from said first feed screw (1) is too high and its temperature is lower than the maximum acceptable one, then the control system first decreases the speed of rotation of said first feed screw (1) until the grain filling level internally to the pipe does not reduce the flow of air excessively internally to the feed screw. Then, if the high humidity and non-excessive temperature conditions last, the control system makes the air temperature and/or flow rate of the air input to the first heat exchanger (3) progressively increase, until temperature reaches the maximum value admitted in order not to damage grain, and finally opens said choking and intercepting means.

According to a preferred operating mode, the control system might determine a minimum speed of the feed screw in which it is presumed that grain occupies approximately one third of the inner diameter of the pipe, in order not to operate close to the air flow obstruction conditions.

The second feed screw control operates in a similar manner, even though, in this case, it is not possible to open the intermediate ventilation ports. If the humidity of the output grain does not reach the desired value, then the speed of rotation of the feed screw is reduced and subsequently the air temperature and/or flow is increased. In a particularly complete embodiment, the air output from the first feed screw (1) is, possibly partially, recirculated, if its relative humidity, as measured by appropriate sensors installed at the output from the feed screw, is not close to saturation or did not reach a predetermined level, upon reaching which the quantity of water absorbed by grain would be minimum. A three-way valve routes the recirculating air towards the fan means, at the input of which it is mixed with external air.

The invention claimed is:

1. A grain dryer to be associated with a combine harvester provided with an endothermic engine, comprising:
    a first feed screw comprising a first pipe having a first grain inlet at a first end and a first grain outlet at a second end which is distal from the first grain inlet, the first pipe comprising a first outer surface and a first inner surface and defining a first inner cavity having a circular geometry and a first diameter, the first pipe further comprises a first air inlet port providing ingress into the first inner cavity, a first air outlet port providing egress from the first inner cavity;
    a second feed screw comprising a second pipe having a second grain inlet at a third end and a second grain outlet at the fourth end which is distal from the second grain inlet, a second outer surface and a second inner surface and defining a second inner cavity having a circular geometry and a second diameter, the second pipe further comprises a second air inlet providing ingress into the second inner cavity and a second air outlet port providing egress from the second inner cavity;

a first rotatable helicoid disposed along a first central axis in the first inner cavity of the first pipe, wherein the first rotatable helicoid comprising a first outer diameter close to the first diameter of the first pipe and wherein the first rotatable helicoid rotates in a direction to transfer grain disposed in the interior of the first pipe from the first grain inlet to the first grain outlet;

a second rotatable helicoid disposed along a second central axis in the second inner cavity of the second pipe, wherein the second rotatable helicoid comprising a second outer diameter close to the first diameter of the first pipe and wherein the second rotatable helicoid rotates in a direction to transfer grain disposed in the interior of the second pipe from the second grain inlet to the second grain outlet;

a first heat exchanger comprising a first heat exchanger air inlet port and a first heat exchanger air outlet port, the first heat exchanger further comprising an exhaust fume inlet port and an exhaust fume outlet port, wherein the exhaust fume inlet port is in communication with exhaust fumes leaving an endothermic engine of a combine harvester, wherein further the first heat exchanger air outlet port is in communication with the first air inlet port of the first feed screw;

a second heat exchanger comprising a second heat exchanger air inlet port and a second heat exchanger air outlet port, the second heat exchanger further comprising an engine cooling liquid inlet port and an engine cooling liquid outlet port, wherein the engine cooling liquid inlet port and the engine cooling liquid outlet port are both in communication with a cooling liquid circuit used to cool the endothermic engine of the combine harvester, wherein further the second heat exchanger air outlet port is in communication with the second air inlet port of the second feed screw;

fan means comprising a fan and an external air inlet port, the fan means further comprising a first output port and a second output port, wherein the first output port is in communication with the first heat exchanger air inlet port and wherein the second output port is in communication with the second heat exchanger air inlet port;

one or more grain humidity sensors that measure the humidity values of the grains disposed in one or more points of the first inner cavity and of the second inner cavity;

wherein the first feed screw has the first air inlet port at the first end and the first air outlet port at the second end and wherein further grain passes through the second feed screw after having passed through the first feed screw.

2. The grain dryer of claim 1, wherein the fan means further comprising a recirculation air inlet port in communication with first air outlet port.

3. The grain dryer of claim 2, wherein the first feed screw further comprises, at the second end, one or more air sensors measuring the relative humidity of the air into the first inner cavity wherein further the first feed screw further comprises a three-way valve at the first outlet port, wherein further the three-way valve recirculates part of the air egressing through the first inner cavity towards the recirculation air inlet port if the relative humidity values as measured by the one or more air sensors indicate a relative humidity lower than a predetermined value.

4. The grain dryer of claim 3, wherein the first feed screw further comprises one or more grain temperature sensors measuring the temperature of the grain into the first inner cavity and wherein one of the one or more grain humidity sensors that measure the humidity values of the grains is disposed in the first inner cavity, wherein further the first feed screw further comprises a plurality of auxiliary air inlet ports disposed along the length of the first pipe, each auxiliary air inlet port providing ingress into the first inner cavity, wherein the air exiting from the first heat exchanger air outlet is directed into one or more of the first air inlet port and the auxiliary external air inlet ports.

5. The grain dryer of claim 1, wherein the second air inlet port is a perforated bottom portion of the second pipe, wherein further the second heat exchanger is disposed longitudinally adjacent to and below the second pipe and wherein further the second heat exchanger air outlet port mates with the perforated bottom portion of the second pipe.

6. The grain dryer of claim 5, wherein the second heat exchanger comprises further a radiator inside which the engine cooling liquid flows from the engine cooling liquid inlet port to the engine cooling liquid outlet port, the radiator comprising an exterior, wherein further the air from the second heat exchanger air inlet port glides over the exterior of the radiator before passing through the second heat exchanger air outlet.

7. The grain dryer of claim 6, wherein the radiator comprises a first radiator end close to the third end and a second radiator end close to the fourth end and wherein further the engine cooling liquid inlet port is at the first radiator end and the engine cooling liquid outlet port is at the second radiator end.

8. The grain dryer of claim 7, wherein the engine cooling liquid flows through the second heat exchanger in the same direction as grains are transferred by the second rotatable helicoid in the second inner cavity of the second pipe.

9. The grain dryer of claim 1, wherein the first feed screw comprises means for measuring the flow of air internally thereto and means for consequently regulating the speed of said first rotatable helicoid in response.

10. The grain dryer of claim 1, wherein the first feed screw further comprises retention means which prevent external air introduced into the first inner cavity of the first pipe from flowing through the first grain inlet.

11. The grain dryer of claim 1, wherein both the first feed screw and the second feed screw are disposed in a horizontal position.

12. The grain dryer of claim 1, wherein the engine cooling liquid circuit comprises an engine radiator and a pipe which connects the engine of the combine harvester with the engine radiator, wherein further the pipe comprises at least one three-way valve which directs the flow of the engine cooling liquid either towards the engine cooling liquid input port of the second heat exchanger or towards the engine radiator of the endothermic engine.

13. The grain dryer of claim 1, wherein the first rotatable helicoid further comprises an external surface of the helicoid and the first rotatable helicoid comprise further a plurality of bulges that project from the external surface of the helicoid.

14. The grain dryer of claim 1, wherein the grain dryer further comprises a transfer feed screw interposed between the first feed screw and the second feed screw, the transfer feed screw comprising a transfer pipe having a transfer pipe grain inlet at a fifth end and a transfer pipe grain outlet at a sixth end which is distal from the transfer pipe grain inlet, the transfer pipe comprising a transfer pipe outer surface and a transfer pipe inner surface and defining a transfer pipe inner cavity having a circular geometry and a transfer pipe diameter and wherein further the grain dryer further comprises a transfer rotatable helicoid disposed along a transfer pipe central axis in the transfer pipe inner cavity of the transfer pipe, wherein the transfer pipe rotatable helicoid comprises a third outer diameter close to the transfer pipe diameter and wherein further the transfer rotatable helicoid rotates in a direction to transfer grain disposed in the transfer pipe inner cavity from the transfer pipe grain inlet to the transfer pipe grain outlet;

wherein further the transfer pipe grain inlet is in communication with the first grain outlet and the transfer pipe grain outlet is in communication with the second grain inlet.

15. The grain dryer of claim 14, wherein the first grain outlet is above the transfer pipe grain inlet and the transfer pipe grain outlet is above the second grain inlet.

16. The grain dryer of claim 1, wherein the first feed screw further comprises one or more grain temperature sensors measuring the temperature of the grain into the first inner cavity and wherein one of the one or more grain humidity sensors that measure the humidity values of the grains is disposed in the first inner cavity, wherein further the first feed screw further comprises a plurality of auxiliary air inlet ports disposed along the length of the first pipe, each auxiliary air inlet port providing ingress into the first inner cavity, wherein the air exiting from the first heat exchanger air outlet is directed into one or more of the first air inlet port and the auxiliary external air inlet ports.

17. A method for operating the grain dryer of claim 16, wherein the speed of rotation of the first rotatable helicoid is decreased if the humidity of the grain exiting from the first grain outlet is higher than a predetermined value and the temperature of the grain is lower than a predetermined value.

18. A method for operating the grain dryer of claim 16, wherein the temperature of the air from the first heat exchanger air outlet port is increased if the humidity of the grain exiting from the first grain outlet is higher than a predetermined value and the temperature of the grain is lower than a predetermined value for a predetermined period.

19. A method for operating the grain dryer of claim 16, wherein the air flow rate of the fan is increased if the humidity of the grain exiting from the first grain outlet is higher than a predetermined value and the temperature of the grain is lower than a predetermined value for a predetermined period.

20. A method for operating the grain dryer of claim 16, wherein the air exiting from the first heat exchanger air outlet and directed into the auxiliary external air inlet ports is increased if the humidity of the grain exiting from the first grain outlet is higher than a predetermined value and the temperature of the grain is lower than a predetermined value.

* * * * *